United States Patent
Kato et al.

(10) Patent No.: US 11,755,893 B2
(45) Date of Patent: Sep. 12, 2023

(54) DISCRIMINATION CALCULATION APPARATUS AND METHOD THEREOF

(71) Applicant: CANON KABUSHIKI KAISHA, Tokyo (JP)

(72) Inventors: Masami Kato, Sagamihara (JP); Tsewei Chen, Tokyo (JP); Yusuke Yachide, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 491 days.

(21) Appl. No.: 16/784,946

(22) Filed: Feb. 7, 2020

(65) Prior Publication Data
US 2020/0175327 A1    Jun. 4, 2020

Related U.S. Application Data

(63) Continuation of application No. PCT/JP2018/028366, filed on Jul. 30, 2018.

(30) Foreign Application Priority Data

Aug. 8, 2017   (JP) ................................. 2017-153187

(51) Int. Cl.
*G06N 3/063*   (2023.01)
*G06F 7/544*   (2006.01)
(Continued)

(52) U.S. Cl.
CPC ........... *G06N 3/063* (2013.01); *G06F 7/5443* (2013.01); *G06F 18/2132* (2023.01); *G06N 3/02* (2013.01);
(Continued)

(58) Field of Classification Search
CPC combination set(s) only.
See application file for complete search history.

(56) References Cited

U.S. PATENT DOCUMENTS

2011/0239032 A1    9/2011  Kato
2017/0124409 A1*   5/2017  Choi ..................... G06V 10/454
(Continued)

FOREIGN PATENT DOCUMENTS

JP    2008-310524 A    12/2008
JP       4217664 B2     2/2009
(Continued)

OTHER PUBLICATIONS

Tsung-Yi Lin, et al., Feature Pyramid Networks for Object Detection, Dec. 9, 2016, 10 pages, Internet, arXiv.org, Cornell University Library, Ithaca, NY, XP080738158.
(Continued)

*Primary Examiner* — David Perlman
(74) *Attorney, Agent, or Firm* — Canon U.S.A., Inc. IP Division

(57) ABSTRACT

In order to perform a discrimination calculation using a small-capacity storage unit, a discrimination calculation apparatus comprises a feature calculation unit configured to sequentially calculate a feature of discrimination target data for each hierarchical layer, a discrimination calculation unit configured to sequentially perform a partial discrimination calculation on the discrimination target data using the feature sequentially calculated by the feature calculation unit and store a result of the partial discrimination calculation in a discrimination result storage unit, and a control unit configured to control the discrimination calculation unit to perform a next partial discrimination calculation using the feature sequentially calculated by the feature calculation unit and the result of the partial discrimination calculation stored in the discrimination result storage unit and to store a result of the next partial discrimination calculation in the discrimination result storage unit.

13 Claims, 15 Drawing Sheets

(51) Int. Cl.
  *G06N 3/02*    (2006.01)
  *G06V 10/82*   (2022.01)
  *G06F 18/2132* (2023.01)
  *G06V 10/764*  (2022.01)
  *G06V 10/44*   (2022.01)
  *G06V 40/16*   (2022.01)

(52) U.S. Cl.
  CPC .......... *G06V 10/454* (2022.01); *G06V 10/764* (2022.01); *G06V 10/82* (2022.01); *G06V 40/161* (2022.01)

(56) References Cited

U.S. PATENT DOCUMENTS

2017/0177972 A1* 6/2017 Cricri ................... G06N 3/0445
  2018/0046894 A1* 2/2018 Yao ......................... G06F 7/483

FOREIGN PATENT DOCUMENTS

JP    2010-134697 A    6/2010
JP       5184824 B2    4/2013

OTHER PUBLICATIONS

Xinlei Chen, et al., Spatial Memory for Context Reasoning in Object Detection, Apr. 13, 2017, 13 pages, Internet, arXiv.org, Cornell University Library, Ithaca, NY, XP080762941.

Patrick Judd, et al., Reduced-Precision Strategies for Bounded Memory in Deep Neural Nets, Conference Paper at ICLR 2016, 12 pages, Internet, arXiv.org, XP055615203.

Zhicheng Yan, et al., HD-CNN: Hierarchical Deep Convolutional Neural Networks for Large Scale Visual Recognition, 2015 IEEE International Conference on Computer Vision(ICCV), Dec. 7, 2015, pp. 2740-2748, IEEE Computer Society, XP032866619.

* cited by examiner

DISCRIMINATION CALCULATION APPARATUS AND METHOD THEREOF

CROSS-REFERENCE TO RELATED APPLICATIONS

This application is a Continuation of International Patent Application No. PCT/JP2018/028366, filed Jul. 30, 2018, which claims the benefit of Japanese Patent Application No. 2017-153187, filed Aug. 8, 2017, both of which are hereby incorporated by reference herein in their entirety.

TECHNICAL FIELD

The present invention relates to a discrimination calculation apparatus and a method thereof, for performing a discrimination calculation on data.

BACKGROUND ART

Japanese Patent No. 4217664 discloses an image processing apparatus that performs processing of personal recognition of a face from an image including the face. In order to detect a face area included in the image, an edge forming a local feature of the face, an edge part forming a local feature of the face obtained by integrating edges, a local feature of the face obtained by integrating edge parts, and a face area obtained by integrating local features are detected. Setting means sets a first local area in the face area such that, of features detected by the detection means, edges forming local features in terms of shapes of parts forming the face are included in the first local area. Furthermore, the setting means sets a second local area in the face area such that the second local area includes an edge part forming a local feature in terms of a positional relationship between parts forming the face. Based on feature groups in the first and second local areas set in the face area by the setting means, identifying means identifies whose face of different individuals the face area belongs to.

SUMMARY OF INVENTION

In Japanese Patent No. 4217664, the detection means detects each feature in the face area included in the image using a hierarchical neural network for detecting the features of the face included in the image. The technique disclosed in Japanese Patent No. 4217664 requires a large-capacity memory to store the features detected by the detection means. In particular, to realize an image processing apparatus using a large-scale hierarchical neural network based on recent techniques, an increase in memory cost occurs which may result in a problem.

An object of the present invention is to provide a discrimination calculation apparatus, a discrimination calculation method, and a program, capable of performing a discrimination calculation using a small-capacity storage unit.

According to an aspect of the present invention, a discrimination calculation apparatus includes feature calculation unit configured to sequentially calculate a feature of discrimination target data for each hierarchical layer, discrimination calculation unit configured to sequentially perform a partial discrimination calculation on the discrimination target data using the feature sequentially calculated by the feature calculation unit and store a result of the partial discrimination calculation in a discrimination result storage unit, and control unit configured to control the discrimination calculation unit to perform a next partial discrimination calculation using the feature sequentially calculated by the feature calculation unit and the result of the partial discrimination calculation stored in the discrimination result storage unit and to store a result of the next partial discrimination calculation in the discrimination result storage unit.

Further features of the present invention will become apparent from the following description of exemplary embodiments with reference to the attached drawings.

DESCRIPTION OF EMBODIMENTS

First Embodiment

Figure 1:
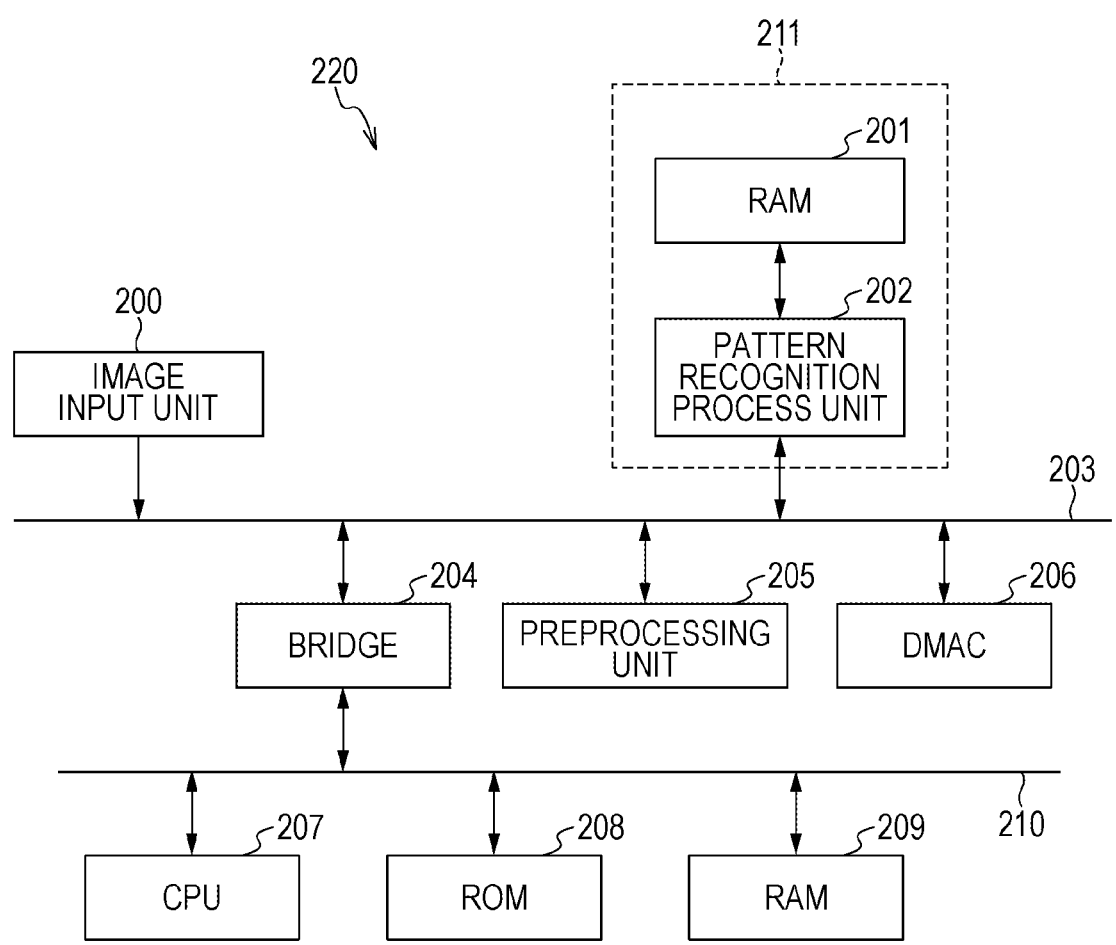
FIG. 1 is a diagram illustrating an example of a configuration of an image processing system according to a first embodiment.

FIG. 1 is a diagram showing an example of a configuration of an image processing system 220 according to a first embodiment of the present invention. The image processing system 220 includes an image input unit 200, a discrimination calculation apparatus 211, an image bus 203, a bridge 204, a preprocessing unit 205, a DMAC 206, a CPU 207, a ROM 208, a RAM 209, and a CPU bus 210. The discrimination calculation apparatus 211 includes a RAM 201 and a pattern recognition process unit 202. The image processing system 220 has a function of detecting an area of a specific object from image data.

The image input unit 200 includes an optical system, a photoelectric conversion device, a driver circuit that controls the photoelectric conversion device, an analog-digital converter, a signal processing circuit that performs an image correction, a frame buffer, and/or the like. The photoelectric conversion device is a CCD (Charge-Coupled Devices) or CMOS (Complimentary Metal Oxide Semiconductor) sensor that generates an image signal by photoelectric conversion. The image input unit 200 outputs digital image data to the image bus 203. The RAM (Random Access Memory) 201 is a calculation work buffer used by the pattern recognition process unit 202. The pattern recognition process unit 202 recognizes a specific pattern from the image using the RAM 201.

The DMAC (Direct Memory Access Controller) 206 transfers data between each processing unit on the image bus 203 and the CPU bus 210. The bridge 204 provides a bridge function between the image bus 203 and the CPU bus 210. The preprocessing unit 205 performs various kinds of preprocessing to make it possible for the pattern recognition process unit 202 to effectively perform the pattern recognition process. More specifically, the preprocessing unit 205 performs, by hardware, an image data conversion process such as a color conversion process, a contrast correction process, and/or the like. The ROM (Read Only Memory) 208 stores a program that defines an operation of the CPU 207 and parameter data. The CPU 207 controls an operation of the image processing system 220 by executing the program stored in the ROM 208. The RAM 209 is a memory necessary for the operation of the CPU 207. The CPU 207 can also access the RAM 201 on the image bus 203 via the bridge 204.

The image input unit 200 outputs the image data to the preprocessing unit 205. The preprocessing unit 205 performs preprocessing on the image data, and outputs the preprocessed image data to the pattern recognition process unit 202. The pattern recognition process unit 202 performs a predetermined discrimination process on the input preprocessed image data in units of pixels, determines an area of a predetermined object in the input image, and stores a determination result as a discrimination map in an image format in the RAM 201.

Figure 2:
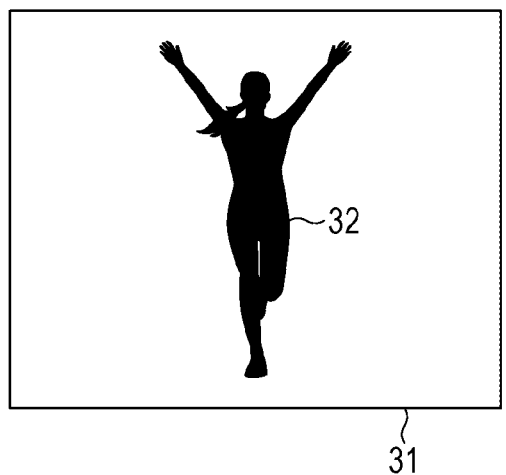
FIG. 2 is a diagram illustrating an example of a discrimination process.

FIG. 2 is a diagram schematically illustrating an example of a determination result for an image to be discriminated by the pattern recognition process unit 202. A person area 32 (indicated by a solid area) in the image 31 is an area obtained as a result of the determination in pixel units. The pattern recognition process unit 202 stores the determination result shown in FIG. 2 in the RAM 201. The DMAC 206 transfers the determination result stored in the RAM 201 to the RAM 209. The CPU 207 executes various application processes using the determination result stored in the RAM 209. For example, the CPU 207 executes processing such as optimum image processing depending on an area of an object.

Figure 3:
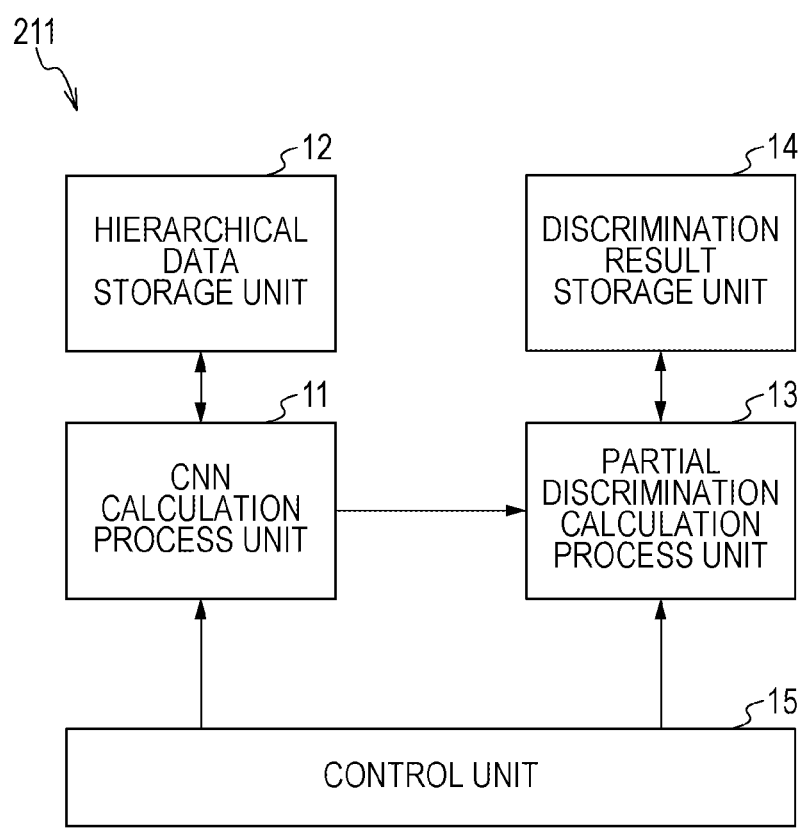
FIG. 3 is a diagram illustrating an example of a configuration of a discrimination calculation apparatus according to the first embodiment.

FIG. 3 is a diagram illustrating an example of a configuration of the discrimination calculation apparatus 211 shown in FIG. 1. The discrimination calculation apparatus 211 includes a CNN calculation process unit 11, a hierarchical data storage unit 12, a partial discrimination calculation process unit 13, a discrimination result storage unit 14, and a control unit 15. CNN (Convolutional Neural Network) stands for a convolutional neural network.

The CNN calculation process unit 11 performs a plurality of types of convolution operations on previous-layer data stored in the hierarchical data storage unit 12, and stores the calculation results in the hierarchical data storage unit 12. The partial discrimination calculation process unit 13 partially performs the calculation of the discrimination process using the calculation result of an intermediate hierarchical layer obtained as the result of the CNN calculation process unit 11, and the partial discrimination calculation process unit 13 stores the partial calculation result of the discrimination process in the discrimination result storage unit 14. The discrimination process performed here is a linear discrimination process generated by a learning method such as a support vector machine or logistic regression. The hierarchical data storage unit 12 and the discrimination result storage unit 14 correspond to the RAM 201 in FIG. 1. The control unit 15 is a processing unit configured to control a processing sequence performed by the CNN calculation process unit 11 and a processing sequence performed by the partial discrimination calculation process unit 13. The control unit 15 is configured by a small-scale CPU or hardware sequencer.

Figure 4:
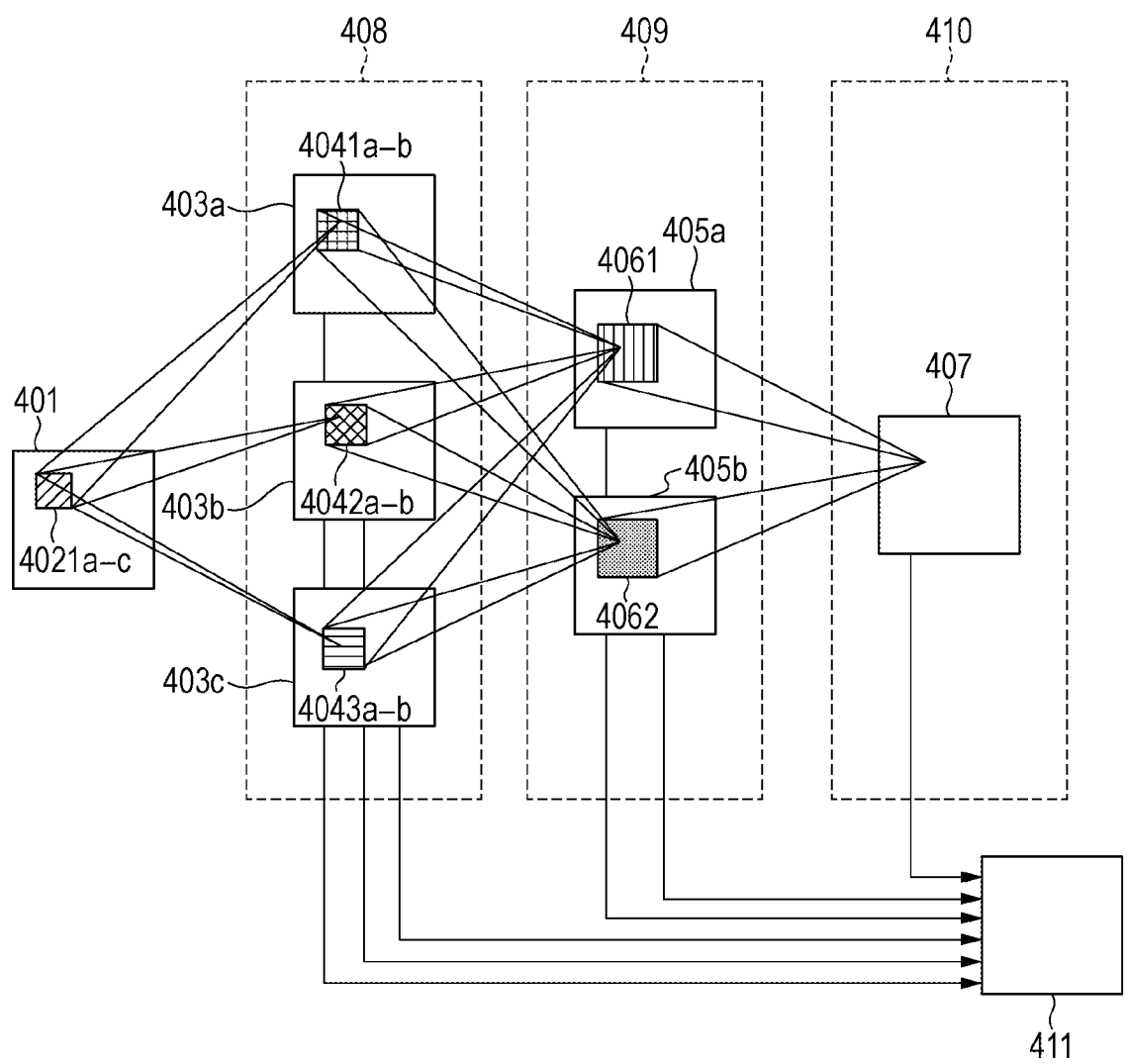
FIG. 4 is a diagram illustrating an example of an algorithm of a pattern recognition process.

FIG. 4 is a diagram illustrating an example of an algorithm of a process performed by the CNN calculation process unit 11 and that by the partial discrimination calculation process unit 13 shown in FIG. 3. In the following description, a discrimination process using a CNN and feature plane data will be explained for a case where the CNN used is small in scale and has only three layers 408 to 410. Note that many practical CNNs are configured using a larger number of pieces of feature plane data and a larger number of hierarchical layers.

In a case where a CNN calculation process is performed on image data, an input layer 401 is given by raster-scanned image data with a predetermined size. Note that the image data in the input layer 401 is discrimination target data. Pieces of feature plane data 403$a$ to 403$c$ are feature plane data in a first hierarchical layer 408. The feature plane data is obtained as a processing result of a predetermined feature extraction calculation (a convolution calculation and nonlinear processing). Since the feature plane data is a processing result for raster-scanned image data, the processing result is also given by a plane. The pattern recognition process unit 202 uses the pieces of feature plane data 403$a$ to 403$c$ as data in an intermediate hierarchical layer for discrimination. The pieces of feature plane data 403$a$ to 403$c$ are calculated by performing a convolution operation and nonlinear processing on the input layer 401. The processing unit 4021$a$ of the CNN calculation process unit 11 calculates the feature plane data 403$a$ by performing a convolution operation using a two-dimensional convolution kernel on the input layer 401, and further performing a non-linear transformation on a calculation result thereof. The processing unit 4021$b$ of the CNN calculation process unit 11 calculates the feature plane data 403$b$ by performing a convolution operation using a two-dimensional convolution kernel on the input layer 401 and further performing a nonlinear transformation on the calculation result thereof. The processing unit 4021$c$ of the CNN calculation process unit 11 calculates the feature plane data 403$c$ by performing a convolution operation using a two-dimensional convolution kernel on the input layer 401 and further performing a nonlinear transformation on the calculation result thereof. The processing units 4021$a$ to 4021$c$ respectively calculate different pieces of feature plane data 403$a$ to 403$c$.

For example, each of the processing units 4021$a$ to 4021$c$ performs a convolution operation with a kernel (a coefficient matrix) of a size given by columnSize×rowSize by performing a product-sum operation such as that shown in formula (1).

$$\text{output}(x, y) = \sum_{row=-rowSize/2}^{rowSize/2} \sum_{column=-columnSize/2}^{columnSize/2} \text{input}(x + \text{column}, y + \text{row}) \times \text{weight}(\text{column}, \text{row}) \quad (1)$$

In this formula (1), input(x, y) represents a reference pixel value at two-dimensional coordinates (x, y) in the input layer 401, output(x, y) represents a calculation result in two-dimensional coordinates(x, y), weight(column, row) represents a weighting coefficient at coordinates (x+column, y+row), and columnSize and rowSize are horizontal and vertical sizes of the two-dimensional convolution kernel.

The CNN calculation process unit 11 repeats the product-sum operation on the input layer 401 while scanning a plurality of convolution kernels in units of pixels, and performs the nonlinear transformation on the final product-sum result thereby obtaining the pieces of feature plane data 403*a* to 403*c*. Note that when the feature plane data 403*a* is calculated, the number of connections with the previous layer is 1, and thus there is one convolution kernel.

Figure 5:
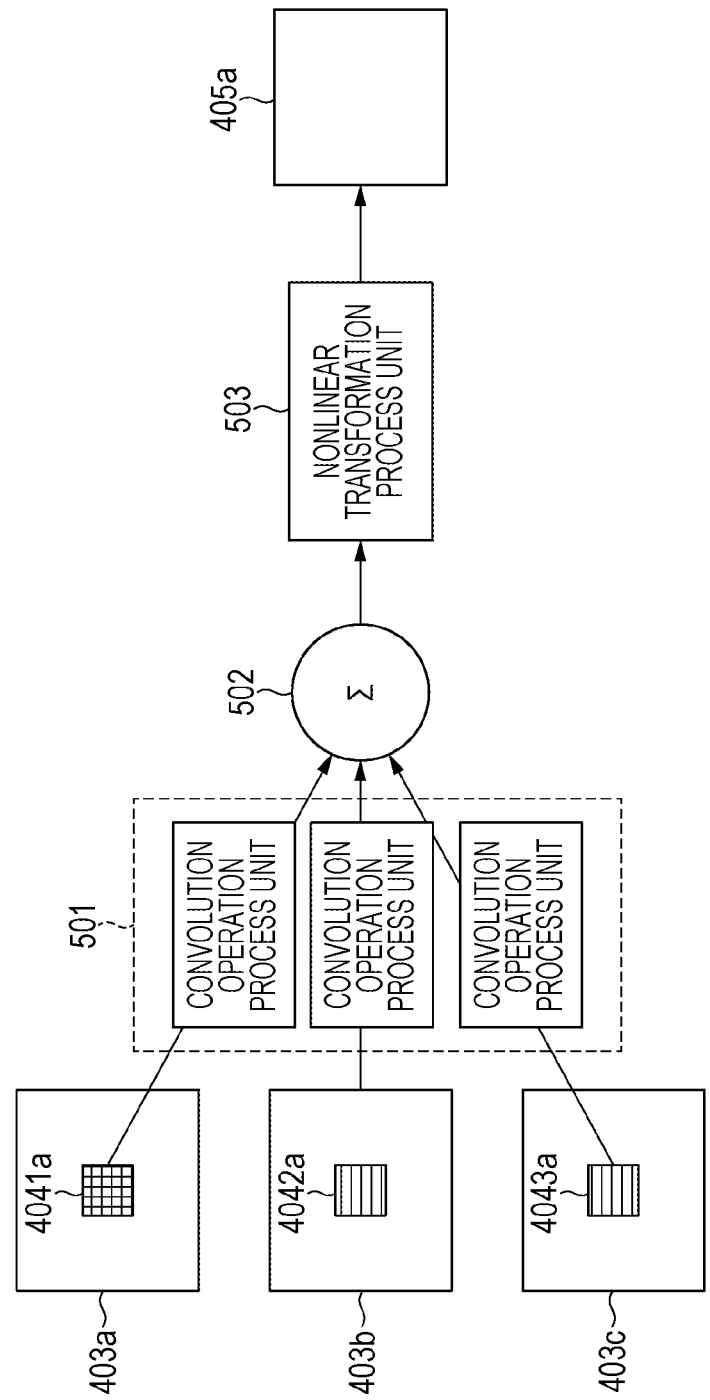
FIG. 5 is a diagram illustrating an example of a configuration of a CNN calculation process unit.

FIG. 5 is a diagram illustrating main calculation units of the CNN calculation process unit 11 shown in FIG. 3. Referring to FIG. 5, a basic operation of the main calculation units will be described below for an example case where the feature plane data 405*a* shown in FIG. 4 is calculated. The feature plane data 405*a* is calculated by performing a convolution operation on the three pieces of feature plane data 403*a* to 403*c* in the previous hierarchical layer 408. The CNN calculation process unit 11 includes a convolution operation process unit 501, a cumulative adder 502, and a nonlinear conversion process unit 503. The convolution operation process unit 501 performs a convolution operation 4041*a* using a kernel on the feature plane data 403*a*, and stores the operation result in the cumulative adder 502. Similarly, the convolution operation process unit 501 performs convolution operations 4041*a* and 4041*c* using kernels on the pieces of feature plane data 403*b* and 403*c*, respectively, and stores the operation results in the cumulative adder 502. Note that the convolution operation process unit 501 may process the three kernels sequentially or in parallel. The cumulative adder 502 cumulatively adds the operation results and outputs the cumulative addition result to the nonlinear conversion process unit 503. The nonlinear conversion process unit 503 performs a nonlinear conversion process using a ReLU (Rectified Linear Unit) function or a logistic function on the cumulative addition result, and outputs the feature plane data 405*a*. The CNN calculation process unit 11 calculates the feature plane data 405*a* by performing the above-described processing while scanning the entire feature plane data 403*a* to 403*c* pixel by pixel.

Similarly, as shown in FIG. 4, the CNN calculation process unit 11 performs three convolution operations 4041*b*, 4042*b*, and 4043*b* respectively on the plurality of pieces of feature plane data 403*a* to 403*c* in the previous hierarchical layer 408 thereby calculating the feature plane data 405*b*. The CNN calculation process unit 11 further performs two convolution operations 4061 and 4062 on the pieces of feature plane data 405*a* and 405*b* in the second hierarchical layer 409 thereby calculating the feature plane data 407 in the third hierarchical layer 410. As described above, the CNN calculation process unit 11 functions as feature calculation unit configured to sequentially calculate feature plane data layer by layer. Note that the coefficients of each convolution operation are determined in advance by learning using a general method such as back-propagation learning.

The partial discrimination calculation process unit 13 concatenates pieces of data located at pixel positions of each piece of feature plane data 403*a* to 403*c*, 405*a* to 405*b* and 407 such that a feature vector is given by a vector formed by respective pieces of concatenated data of each piece of feature plane data. On these feature vectors, the discrimination calculation partial process unit 13 performs a linear discrimination calculation process, and outputs a discrimination map 411. Since the feature vector is data obtained by concatenating the feature plane data corresponding to the pixel positions, in the case of the network shown in FIG. 4, a 6-dimensional feature vector is obtained for corresponding six pieces of feature plane data 403*a* to 403*c*, 405*a* to 405*b*, and 407. The partial discrimination calculation process unit 13 performs a linear discrimination calculation for each pixel position in accordance with formula (2).

$$\text{result}(x, y) = \sum_{n=0}^{LayerNumber-1} \sum_{f=0}^{FeaturemapNumber-1} \text{featuremap}(n, f, x, y) \times \text{weight}(n, f) \quad (2)$$

In this formula (2), featuremap(n, f, x, y) is a value of f-th feature plane data in an n-th hierarchical layer at coordinates (x, y), result(x, y) is a discrimination result for data at coordinates (x, y), weight(n, f) is a coefficient for the f-th feature plane data in the n-th hierarchical layer, LayerNumber is the number of hierarchical layers, and FeaturemapNumber is the number of pieces of feature plane data included in the n-th hierarchical layer.

Furthermore, weight (n, f) is a coefficient learned in advance by logistic regression, a support vector machine, or the like. The partial discrimination calculation process unit 13 outputs the result of processing for each pixel position of the feature plane data by the calculation of formula (2) as the discrimination map 411. Since the partial discrimination calculation process unit 13 performs a discrimination process for each pixel position, the discrimination result is also generated as a discrimination map 411 in an image format. In the discrimination map 411, a value corresponding to each pixel position indicates a probability for a target object area.

Figure 6:
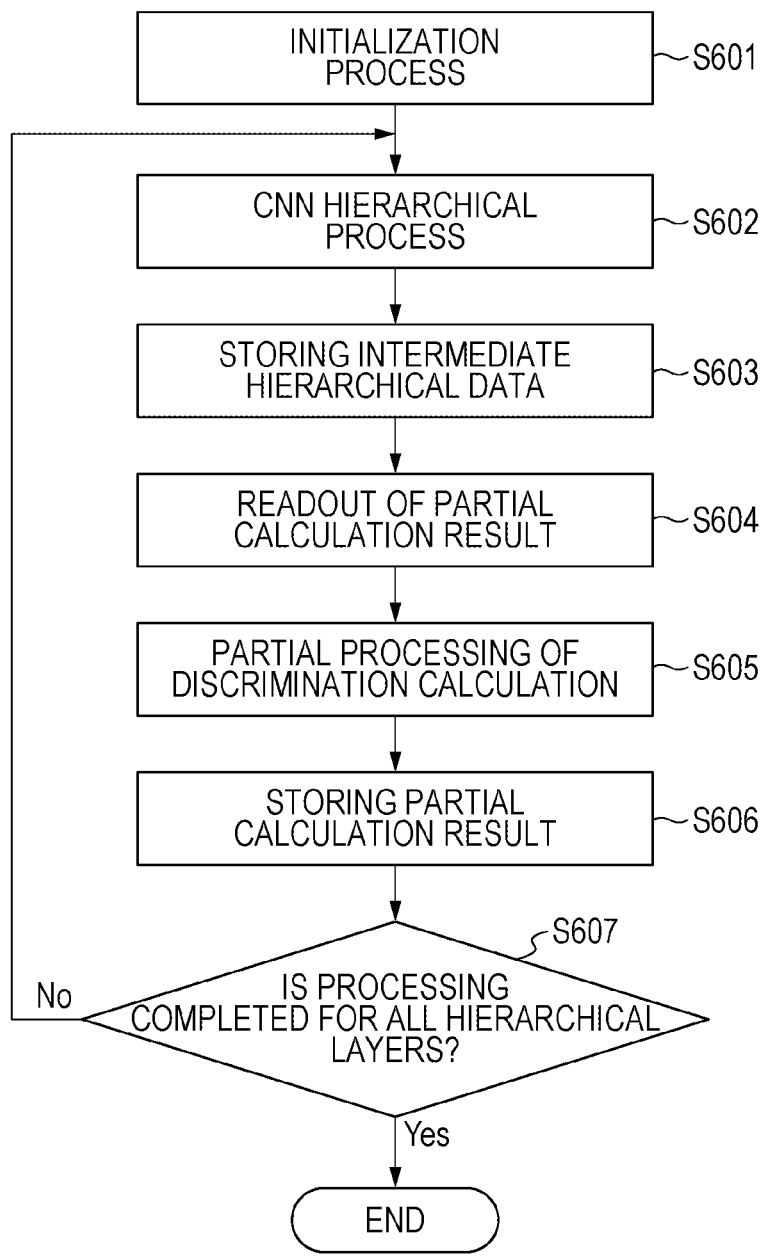
FIG. 6 is a flow chart illustrating a discrimination calculation method according to the first embodiment.

FIG. 6 is a flow chart illustrating a discrimination calculation method by the discrimination calculation apparatus 211 shown in FIG. 3. In step S601, the control unit 15 sets parameters for specifying an operation of the CNN calculation process unit 11 and an operation of the partial discrimination calculation process unit 13. Next, in step S602, the CNN calculation process unit 11 performs a CNN calculation for one hierarchical layer and calculates feature plane data for the one hierarchical layer. For example, the CNN calculation process unit 11 calculates feature plane data in a hierarchical layer 408 in FIG. 4 and calculates pieces of feature plane data 405*a* and 405*b*. Next, in step S603, the CNN calculation process unit 11 stores the feature plane data calculated in step S602, as intermediate hierarchical data, in the hierarchical data storage unit 12. The CNN calculation process unit 11 sequentially performs CNN calculations in step S602, and stores the feature plane data in the hierarchical data storage unit 12 in step S603.

Next, in step S604, the partial discrimination calculation process unit 13 reads a partial calculation result of the discrimination process based on the result of the feature extraction process for the previous hierarchical layer stored in the discrimination result storage unit 14. Next, in step S605, based on the calculation result read out in step S604 and the feature plane data in terms of the hierarchical layer output via the processing by the CNN calculation process unit 11, the partial discrimination calculation process unit 13 performs a partial discrimination process according to formula (3).

$$\text{part\_result}(n, x, y) = \text{part\_result}(n-1, x, y) + \sum_{f=0}^{\text{featurema number}-1} \text{featuremap}(n, f, x, y) \times \text{weight}(n, f) \quad (3)$$

In this formula (3), featuremap(n, f, x, y) is a value of f-th feature plane data in an n-th hierarchical layer at coordinates (x, y), weight(n, f) is a coefficient for the f-th feature plane data in the n-th hierarchical layer, featuremap_number is the number of pieces of feature plane data in the n-th hierarchical layer, part_result(n−1, x, y) is a result of a partial discrimination calculation performed for feature plane data up to the (n−1)th hierarchical layer, and part_result(n, x, y) is a result of a partial discrimination calculation performed for feature plane data up to the n-th hierarchical layer.

The partial discrimination calculation process unit 13 calculates a sum of part_result(n−1, x, y) given as the result of the discrimination calculation process performed for up to (n−1)th hierarchical layer in formula (3) and an inner product of feature plane data featuremap(n, f, x, y) and weighting factors weight(n, f). Thus, the partial discrimination calculation process unit 13 obtains part_result(n, x, y) as a result of a partial discrimination calculation for the n-th hierarchical layer.

An overall result of the linear discrimination calculation result(x, y) is obtained by calculating a sum of inner products of featuremap(n, f, x, y) of the entire feature plane data and corresponding weighting factors weight(n, f) as shown in formula (2). In the present embodiment, in step S604, the partial discrimination calculation process unit 13 reads out part_result(n−1, x, y) indicating the result of the partial discrimination calculation performed for up to the previous hierarchical layer from the discrimination result storage unit 14. Next, in step S605, the partial discrimination calculation process unit 13 calculates the second term on the right side of formula (3), and calculates a sum of the second term on the right side of formula (3) and the calculation result part_result (n−1, x, y) read in step S604. Thus, the partial discrimination calculation process unit 13 obtains a partial discrimination calculation result part_result (n, x, y) calculated for up to the current hierarchical layer. That is, the partial discrimination calculation process unit 13 executes a calculation of a part of hierarchical layers in the discrimination process calculation. Therefore, in step S603, the CNN calculation process unit 11 may store only the feature plane data of hierarchical layers necessary for a next CNN calculation in the hierarchical data storage unit 12.

Figure 7:
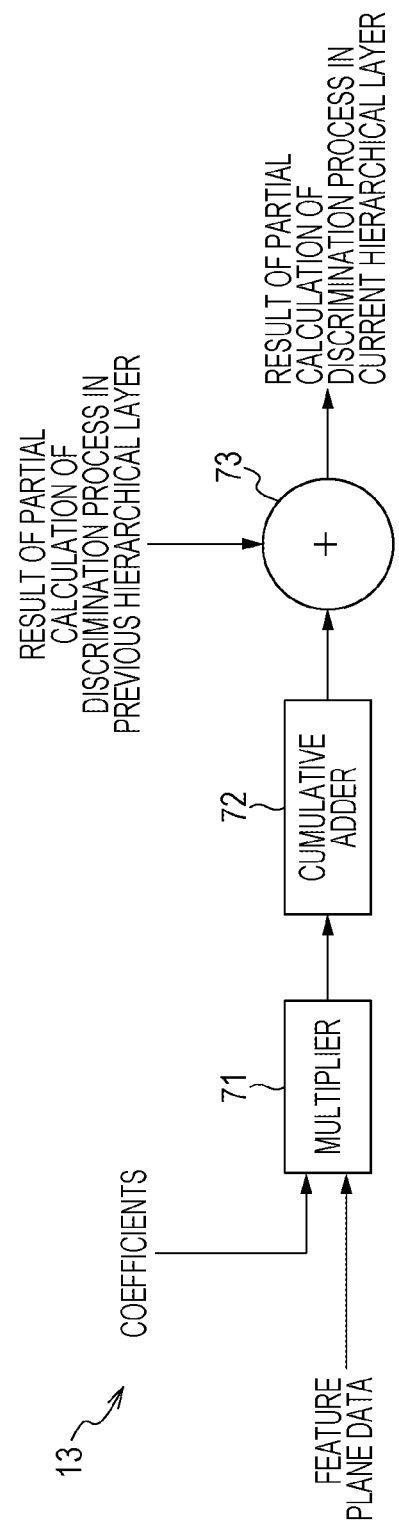
FIG. 7 is a diagram illustrating an example of a configuration of a partial discrimination calculation process unit.

FIG. 7 is a diagram illustrating an example of a configuration of the partial discrimination calculation process unit 13 shown in FIG. 3. The partial discrimination calculation process unit 13 includes a multiplier 71, a cumulative adder 72, and an adder 73. The multiplier 71 performs a multiplication of an # f-th feature plane data featuremap (n, f, x, y) in the n-th hierarchical layer by the weight coefficients weight(n, f). The cumulative adder 72 cumulatively adds the multiplication results output by the multiplier 71 for respective pieces of feature plane data, and outputs the data of the second term on the right side of formula (3).

Figure 8:
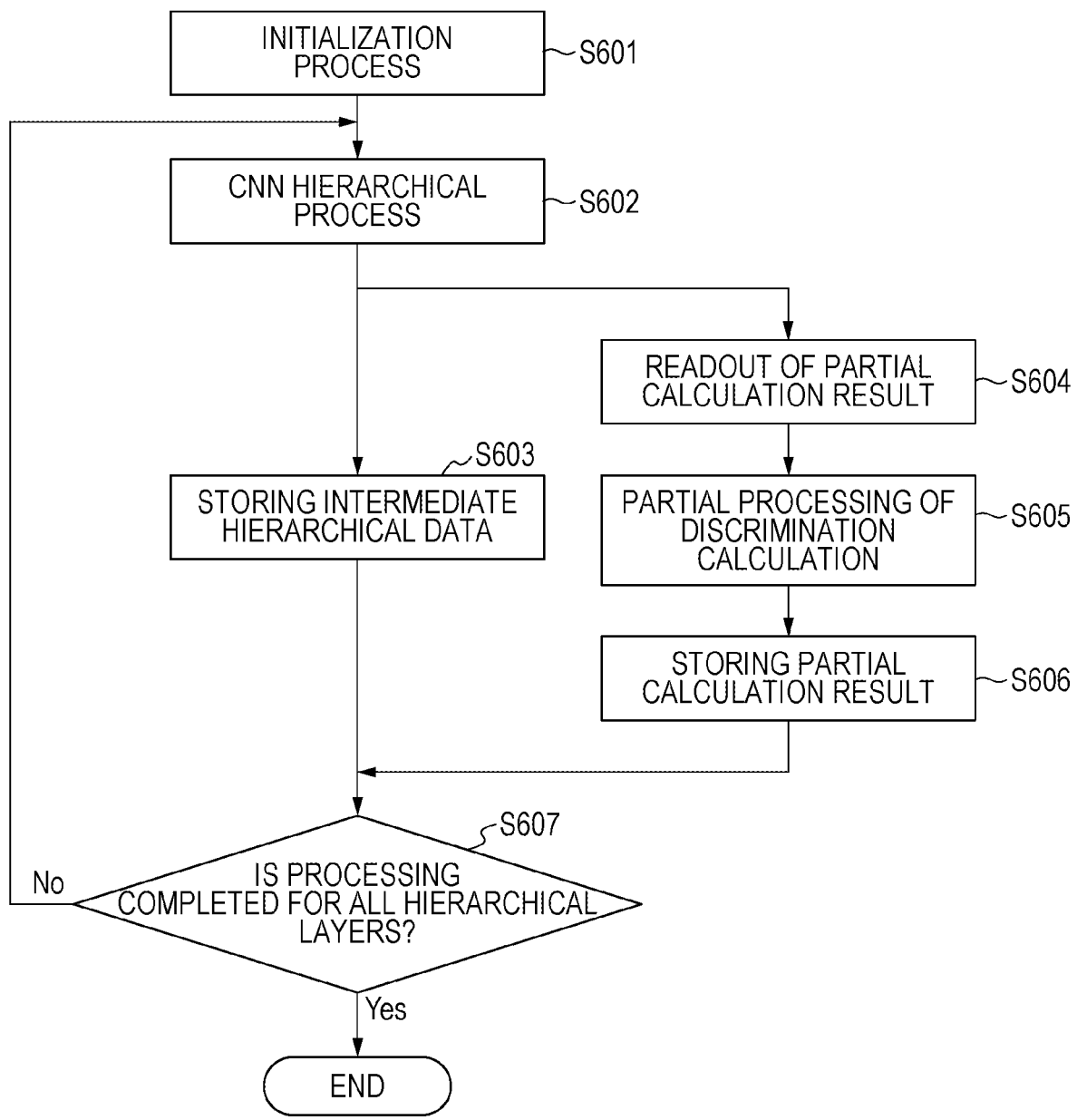
FIG. 8 is a flow chart illustrating another discrimination calculation method.

The multiplier 71 may read out the feature plane data in the n-th hierarchical layer being processed such that feature plane data is read out each time the process of the CNN calculation in units of pixels by the CNN calculation process unit 11 is completed, or such that feature plane data is buffered in the hierarchical data storage unit 12 and feature plane data is read out at a time in particular units. For example, FIG. 8 illustrates an example of a modification of the flow chart shown in FIG. 6. In this modification, the position of step S603 is different from that shown in FIG. 6. In FIG. 8, step S603 is processed in parallel to steps S604 to S606. In a case where the hierarchical data storage unit 12 and the discrimination result storage unit 14 are configured using physically different memories or the like, it is expected that the parallel processing described above result in an increase in the processing speed.

The adder 73 shown in FIG. 7 calculates the sum of partial determination operation result part_result (n−1, x, y) for up to the previous hierarchical layer stored in the discrimination result storage unit 14 and the data of the second term on the right side of formula (3) output by cumulative adder 72. The adder 73 then outputs a partial discrimination calculation result part_result (n, x, y) for up to the current hierarchical layer on the left side of formula (3).

As described above, the multiplier 71 and the cumulative adder 72 calculate the sum of products of the feature plane data featuremap (n, f, x, y) in the present hierarchical layer and the weight coefficients weight(n, f). The adder 73 adds the result of the sum of products calculated for the current hierarchical layer output by the cumulative adder 72 and the result, part_result (n−1, x, y), of the sum of products calculated for up to the previous hierarchical layer stored in the discrimination result storage unit 14 and stores a resultant sum in the discrimination result storage unit 14.

Next, in step S606 in FIG. 6, the partial discrimination calculation process unit 13 stores, in the discrimination result storage unit 14, the partial discrimination calculation result part_result (n, x, y) calculated for up to the current hierarchical layer obtained in step S605. This discrimination calculation result part_result (n, x, y) is used, in the processing for a next hierarchical layer, as a partial discrimination calculation result part_result (n−1, x, y) up to the previous hierarchical layer. Next, in step S607, the control unit 15 determines whether or not processing has been completed for all hierarchical layers. In a case where the control unit 15 determines that the processing has not been completed for all hierarchical layers, the control unit 15 returns the processing to step S602 and repeats the processing for a next hierarchical layer. In a case where the control unit 15 determines that the processing has been completed for all hierarchical layers, the control unit 15 ends the processing. Thus, by performing the processing described above, the discrimination calculation apparatus 211 obtains a discrimination map 411 as the result of the discrimination calculation process for all hierarchical layers.

As described above, the CNN calculation process unit 11 functions as a feature calculation unit configured to sequentially calculate feature plane data on discrimination target data given in the input layer 401 layer by layer. More specifically, the CNN calculation process unit 11 calculates pieces of feature plane data 403*a* to 403*c* in a first hierarchical layer 408 based on discrimination target data given in the input layer 401, and stores the pieces of feature plane data 403*a* to 403*c* in the first hierarchical layer into the hierarchical data storage unit (the feature storage unit) 12.

Next, the CNN calculation process unit 11 calculates pieces of feature plane data 405a and 405b in a second hierarchical layer 409 based on the pieces of feature plane data 403a to 403c in the first hierarchical layer 408 stored in the hierarchy data storage unit 12, and stores the calculated pieces of feature plane data 405a and 405b into the hierarchical data storage unit 12. Next, the CNN calculation process unit 11 calculates feature plane data 407 in a third hierarchical layer 410 based on the pieces of feature plane data 405a and 405b in the second hierarchical layer 409 stored in the hierarchy data storage unit 12, and stores the calculated feature plane data 407 into the hierarchical data storage unit 12.

The partial discrimination calculation process unit 13 sequentially performs partial discrimination calculations on the discrimination target data given in the input layer 401 using the feature plane data sequentially calculated by the CNN calculation process unit 11, and stores the result of the partial discrimination calculations in the discrimination result storage unit (the discrimination result storage unit) 14. The partial discrimination calculation process unit 13 performs a next partial discrimination calculation using the feature plane data sequentially calculated by the CNN calculation process unit 11 and the result of the partial discrimination calculation stored in the discrimination result holding unit 14, and stores a result of the next partial discrimination calculation in the discrimination result storage unit 14.

Figure 9:
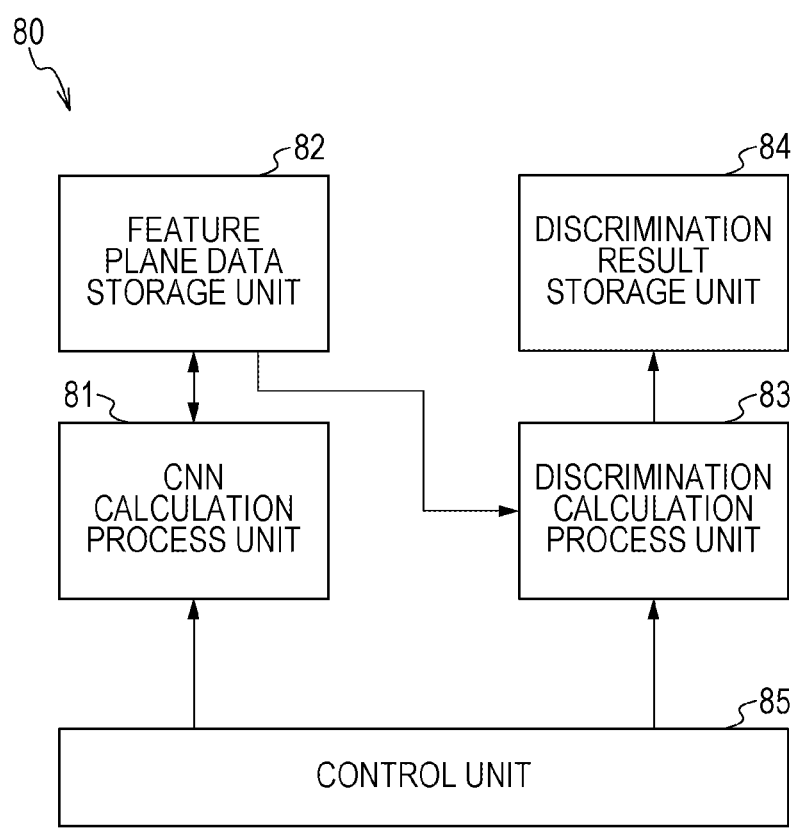
FIG. 9 is a diagram illustrating an example of a configuration of a discrimination calculation apparatus according to a basic technique.
Figure 10:
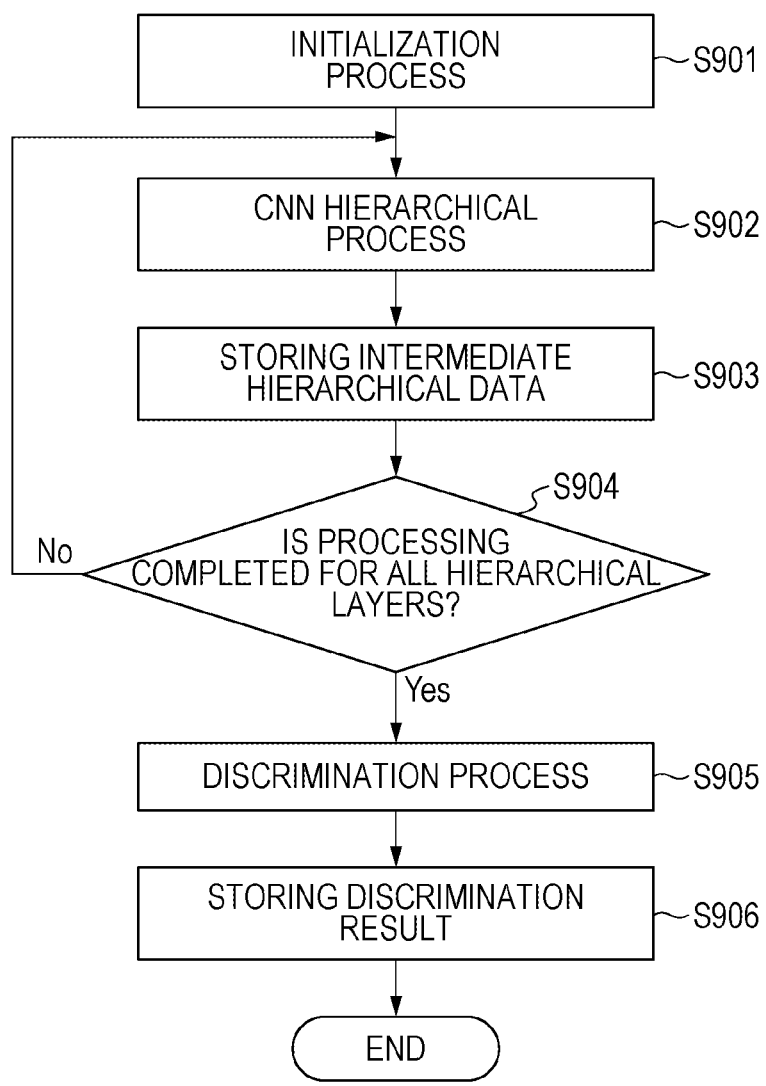
FIG. 10 is a flow chart illustrating a discrimination calculation method according to a basic technique.

Next, features of the discrimination calculation apparatus 211 according to the present embodiment shown in FIG. 3 and FIG. 6 are described in comparison with a discrimination calculation apparatus 80 according to a basic technology shown in FIG. 9 and FIG. 10. FIG. 9 is a diagram illustrating an example of a configuration of the discrimination calculation apparatus 80 according to the basic technique. The discrimination calculation apparatus 80 includes a CNN calculation process unit 81, a feature plane data storage unit 82, a discrimination calculation process unit 83, a discrimination result storage unit 84, and a control unit 85. The CNN calculation process unit 81 performs a convolution operation on the feature plane data stored in the feature plane data storage unit 82 and stores a result of the calculation in the feature plane data storage unit 82. The CNN calculation process unit 81 stores feature plane data of all hierarchical layers in the feature plane data storage unit 82. The discrimination calculation process unit 83 refers to the feature plane data stored in the feature plane data storage unit 82 and executes a discrimination calculation process. The discrimination calculation process unit 83 stores a result thereof in the discrimination result storage unit 84. The control unit 85 is a processing unit configured to control a processing sequence performed by the CNN calculation process unit 81 and a processing sequence performed by the discrimination calculation process unit 83. The control unit 85 is configured by a small-scale CPU or hardware sequencer.

FIG. 10 is a flow chart illustrating a discrimination calculation method by the discrimination calculation apparatus 80 shown in FIG. 9. In step S901, the control unit 85 sets parameters for specifying an operation of the CNN calculation process unit 81 and an operation of the discrimination calculation process unit 83. Next, in step S902, the CNN calculation process unit 81 performs a CNN calculation for one hierarchical layer thereby obtaining feature plane data for the one hierarchical layer. Next, in step S903, the CNN calculation process unit 81 stores the feature plane data calculated in step S902 in the feature plane data storage unit 82. Next, in step S904, in a case where the control unit 85 determines that the processing has not been completed for all hierarchical layers, the control unit 85 returns the processing to step S902 and repeats the processing for a next hierarchical layer. In this case, in step S903, the CNN calculation process unit 81 stores pieces of feature plane data of respective hierarchical layers in different areas of the feature plane data storage unit 82. In a case where the control unit 85 determines that the processing has been completed for all hierarchical layers, the control unit 85 advances the processing to step S905. In step S905, the discrimination calculation process unit 83 refers to the feature plane data of each hierarchical layer stored in the feature plane data storage unit 82, and performs a discrimination calculation process according to formula (2). Next, in step S906, the discrimination calculation process unit 83 stores a discrimination result in the discrimination result storage unit 84.

In the discrimination calculation apparatus 80 according to the basic technology, the CNN calculation process unit 81 stores the feature plane data of all hierarchical layers in the feature plane data storage unit 82. For example, when a network shown in FIG. 4 is processed, the feature plane data storage unit 82 needs to store feature plane data of 5×feature plane data size (it is assumed that the feature plane data size is equal for all hierarchical layers).

On the other hand, in the discrimination calculation apparatus 211 according to the present embodiment, the hierarchical data storage unit 12 only needs to be able to hold the feature plane data for two layers necessary for processing the next CNN calculation of the CNN calculation process unit 11. In the network in FIG. 4, in a case where feature plane data of a hierarchical layer 409 is calculated, the hierarchical data storage unit 12 stores a maximum amount of feature plane data. In this case, the hierarchical data storage unit 12 holds feature plane data of 4×feature plane data size. That is, in the case of the present embodiment, the discrimination calculation apparatus 211 can reduce the capacity of the hierarchical data storage unit 12 for storing the feature plane data.

In the example shown in FIG. 4, the CNN has a small size for simplicity of explanation. However, in practical CNNs, CNNs include a large number of hierarchical layers. Therefore, the effect of reducing the capacity of the hierarchical data storage unit 12 is extremely large. For example, an explanation is given below for a case in which each hierarchical layer has a 64 feature planes (it is assumed that the number of feature planes is equal for all hierarchical layers), and the number of hierarchical layers is 10. In this case, the discrimination calculation apparatus 80 according to the basic technique needs the feature plane data storage unit 82 with a capacity for 64×10 pieces of feature plane data. On the other hand, in the discrimination calculation apparatus 211 according to the present embodiment, the hierarchical data storage unit 12 needs a capacity for only 64×2 pieces of feature plane data. In particular, when the present embodiment is applied to a method for calculating CNN with a memory having a small capacity such as that disclosed in Japanese Patent No. 5184824, a further enhanced effect can be achieved.

As described above, in the discrimination calculation apparatus 211 according to the present embodiment, storing intermediate hierarchical data (feature plane data) of CNN in the hierarchical data storage unit 12 makes it possible to reduce the capacity of the hierarchical data storage unit 12, which allows a reduction in cost.

Second Embodiment

Figure 11:
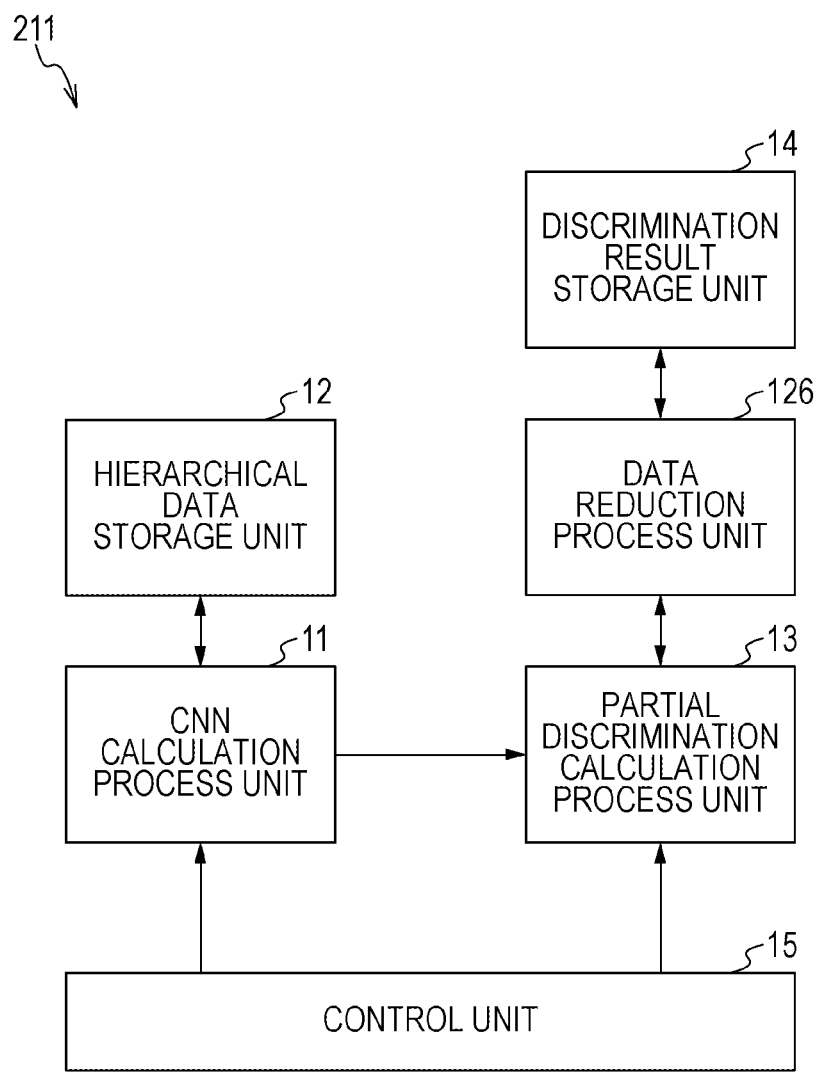
FIG. 11 is a diagram illustrating an example of a configuration of a discrimination calculation apparatus according to a second embodiment.

FIG. 11 is a diagram illustrating an example of a configuration of the discrimination calculation apparatus 211 according to a second embodiment of the present invention. The discrimination calculation apparatus 211 shown in FIG. 11 is obtained by adding a data reduction process unit 126 to the discrimination calculation apparatus 211 shown in FIG. 3. The data reduction process unit 126 is provided between the partial discrimination calculation process unit 13 and the discrimination result storage unit 14. Note that the data reduction process unit 126 may be provided in the partial discrimination calculation process unit 13. Differences of the present embodiment from the first embodiment are described below.

In the first embodiment, the partial discrimination calculation process unit 13 stores the result of the cumulative addition of the partial calculation result of each hierarchical layer in the discrimination result storage unit 14. In this case, the partial discrimination calculation process unit 13 needs an increasing number of calculation digits with proceeding of the cumulative addition process. Therefore, in a case where the processing is performed using integer fixed-point calculations, it is required to increase the memory data width of the discrimination result storage unit 14. The increase in the memory data width directly leads to an increase in the capacity of the discrimination result storage unit 14 and causes an increase in cost of the discrimination calculation apparatus 211. Therefore, it is desirable to perform processing with a memory data width as small as possible. In the present embodiment, the data reduction process unit 126 and the partial discrimination calculation process unit 13 reduce the number of digits of the discrimination calculation result output by the partial discrimination calculation process unit 13 and store the discrimination calculation result with the reduced number of digits in the discrimination result storage unit 14.

Figure 12:
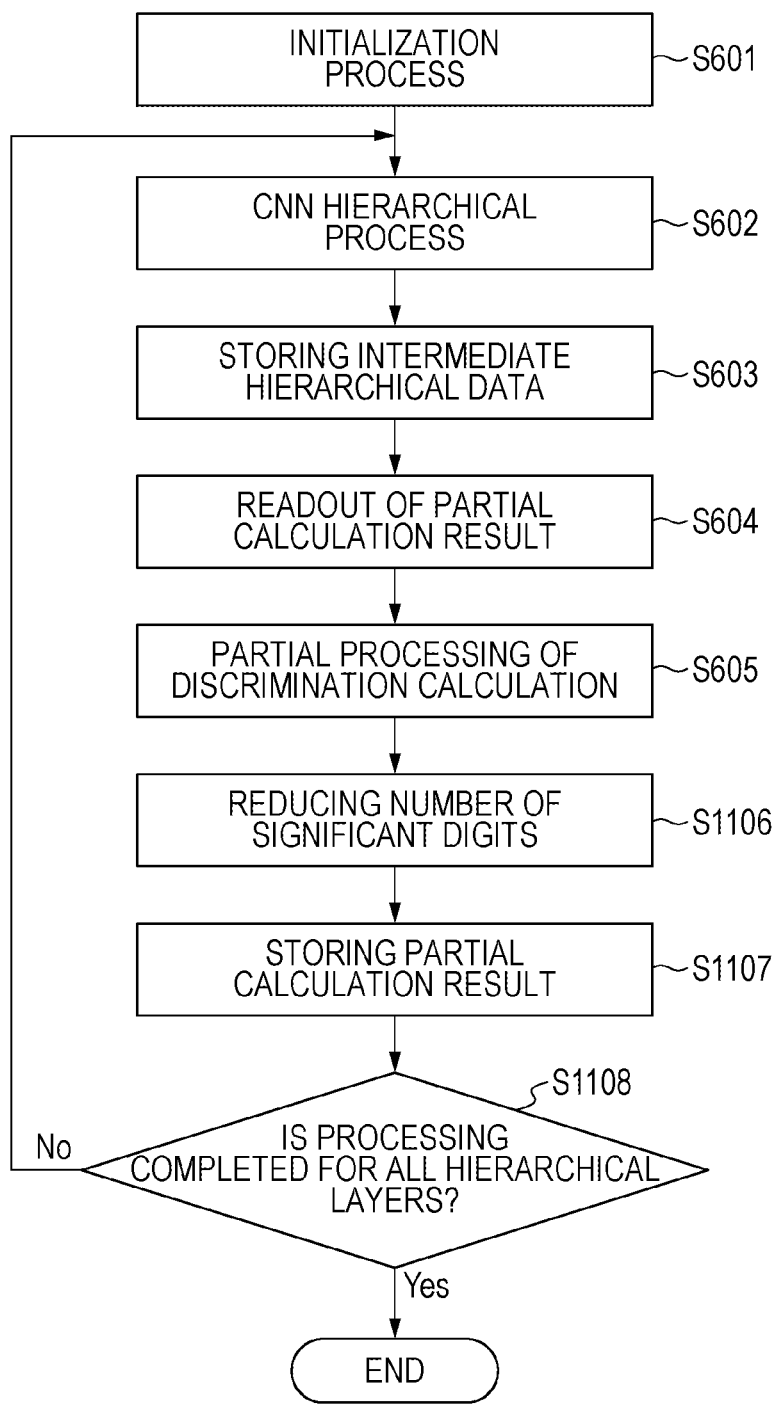
FIG. 12 is a flow chart illustrating a discrimination calculation method according to the second embodiment.

FIG. 12 is a flow chart showing a discrimination calculation method by the discrimination calculation apparatus 211 shown in FIG. 11. In the flow chart shown in FIG. 12, steps S1106 to S1108 are provided instead of steps S606 and S607 in the flow chart shown in FIG. 6.

First, the discrimination calculation apparatus 211 performs processing in steps S601 to S605 as with the processing shown in FIG. 6. Next, in step S1106, the data reduction process unit 126 and the partial discrimination calculation process unit 13 reduce the number of digits of the partial calculation result in the discrimination process in step S605 according to formula (3). More specifically, the data reduction process unit 126 and the partial discrimination calculation process unit 13 extract data of a particular number of digits at a particular digit position from the result of the sum of products on the second term on the right side of formula (3), and add a value of the first term on the right side of formula (3) to the extracted data. That is, the data reduction process unit 126 and the partial discrimination calculation process unit 13 reduce the number of digits of the result of the sum products of the feature plane data of the current hierarchical layer and the weighting coefficient, and add the result of the sum of products with the reduced number of digits to the result of the sum of products calculated for up to the previous hierarchical layer. The addition result is stored in the discrimination result storage unit 14.

Figure 13:
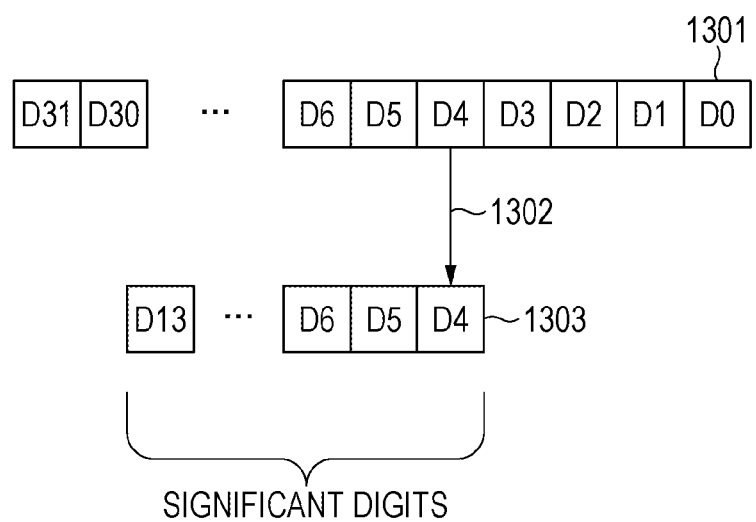
FIG. 13 is a diagram showing an example of reducing the number of digits.

FIG. 13 is a diagram illustrating a specific example of the digit number reduction processing by the data reduction process unit 126. A binary data bit string 1301 is a data bit string of a partial calculation result output from by the partial discrimination calculation process unit 13, and includes 32-bit data Dn (n: 0 to 31). The bit data Dn is an element of the binary data bit string 1301 and indicates a 32-bit data string. In step S1106, the data reduction process unit 126 extracts data 1303 of a required number of significant digits at a predetermined data extraction digit position 1302 in the binary data bit string 1301. For example, the data 1303 may be 10-bit data. The data extraction digit position 1302 is a parameter given in advance in step S1106. The data extraction digit position 1302 is specified by a value determined based on the decimal point position of the feature plane data in step S602, the decimal point position of the weighting coefficient used in the discrimination process, and the decimal point position of the data stored in the discrimination result storage unit 14. That is, the data extraction digit position 1302 is a parameter necessary for matching the digit positions of the first term on the right side of formula (3) and the second term on the right side of formula (3).

The data extraction digit position 1302 may be different for each hierarchical layer or for each category of the discrimination target data. The result of step S602 and the data distribution of the corresponding weighting coefficients of the discrimination process may differ depending on the hierarchy and category. In such a case, each decimal point position is different. In step S1106, taking into account each decimal point position, the data reduction process unit 126 extracts the data 1303 with the required number of digits such that the number of digits matches that of the data stored in the discrimination result storage unit 14. Each decimal point position is determined in advance using test data, and correspondingly, a data extraction digit position 1302 is determined in advance. In the determination of the number of digits of the data 1303, there is a trade-off between memory cost and calculation accuracy, which is also determined in advance using test data.

In the present embodiment, as can be seen from formula (3), a calculation is first performed to determine the sum of the inner product of the feature plane data of all hierarchical layer and the weighting coefficients and the partial calculation for the previous hierarchical layer stored in the discrimination result storage unit 14, and then the reduction of the number of digits is performed. However, the processing is not limited to this. For example, the processing may be performed such that the reduction of the number of digits is performed for each predetermined number of pieces of feature plane data in the hierarchical layer, and data is accumulated in the discrimination result storage unit 14 due to mounting restrictions or the like. From the viewpoint of discrimination accuracy, it is desirable to perform the reduction of the number of digits after the inner product operation is performed for as many pieces of feature plane data as possible using the cumulative adder 72 (FIG. 7) having a sufficiently large number of digits. However, the processing is not limited to such a method.

Next, in step S1107 in FIG. 12, the partial discrimination calculation process unit 13 writes the partial discrimination calculation result for up to the current hierarchy in which the number of digits is reduced in step S1106 in the discrimination result storage unit 14. Next, in step S1108, the control unit 15 determines whether or not processing has been completed for all hierarchical layers. In a case where the control unit 15 determines that the processing has not been completed for all hierarchical layers, the control unit 15 returns the processing to step S602 and repeats the processing for a next hierarchical layer. In a case where the control unit 15 determines that the processing has been completed for all hierarchical layers, the control unit 15 ends the processing. By performing the processing described above, the discrimination calculation apparatus 211 obtains discrimination calculation results of all hierarchical layers as the discrimination map 411.

As described above, according to the present embodiment, it is possible to realize the discrimination process using the intermediate layer data of the CNN using the layer data storage unit 12 having a small capacity. Furthermore, the data reduction process unit 126 appropriately reduces the number of digits of the partial discrimination calculation and thus the capacity of the discrimination result storage unit 14 can be reduced. As a result, further capacity reduction of the RAM 201 is expected.

Third Embodiment

Figure 14:
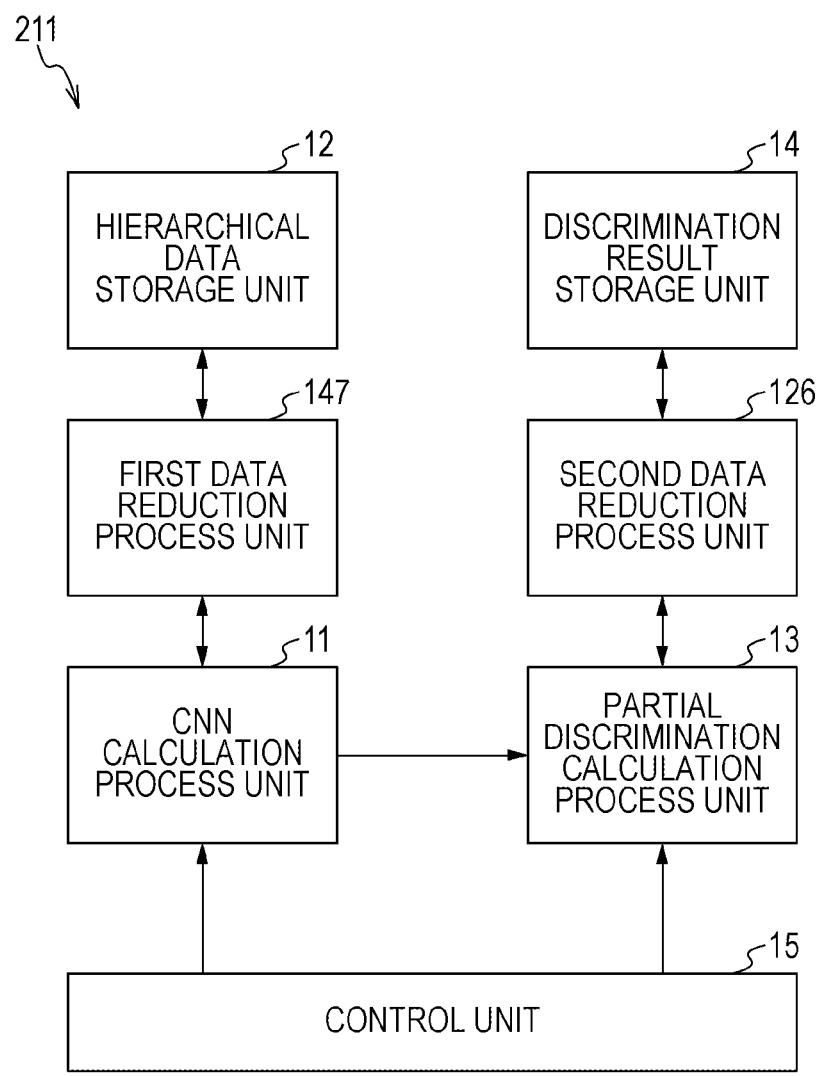
FIG. 14 is a diagram illustrating an example of a configuration of a discrimination calculation apparatus according to a third embodiment.

FIG. 14 is a diagram illustrating an example of a configuration of the discrimination calculation apparatus 211 according to a third embodiment of the present invention. The discrimination calculation apparatus 211 shown in FIG. 14 is obtained by adding a first data reduction process unit 147 to the discrimination calculation apparatus 211 shown in FIG. 11. A second data reduction process unit 126 in FIG. 14 corresponds to the data reduction process unit 126 in FIG. 11. The first data reduction process unit 147 is provided between the CNN calculation process unit 11 and the hierarchical data storage unit 12. The first data reduction process unit 147 may be provided in the CNN calculation process unit 11. Differences of the present embodiment from the second embodiment are described below. In a case where the discrimination calculation apparatus 211 is an embedded apparatus, in general, all processing is performed using integer fixed-point calculations. The CNN calculation process unit 11 generates feature plane data by performing a CNN calculation process using an integer type. The first data reduction process unit 147 and the CNN calculation process unit 11 reduce the number of digits of the feature plane data, and stores the feature plane data with the reduced number of digits into the hierarchical data storage unit 12.

Figure 15:
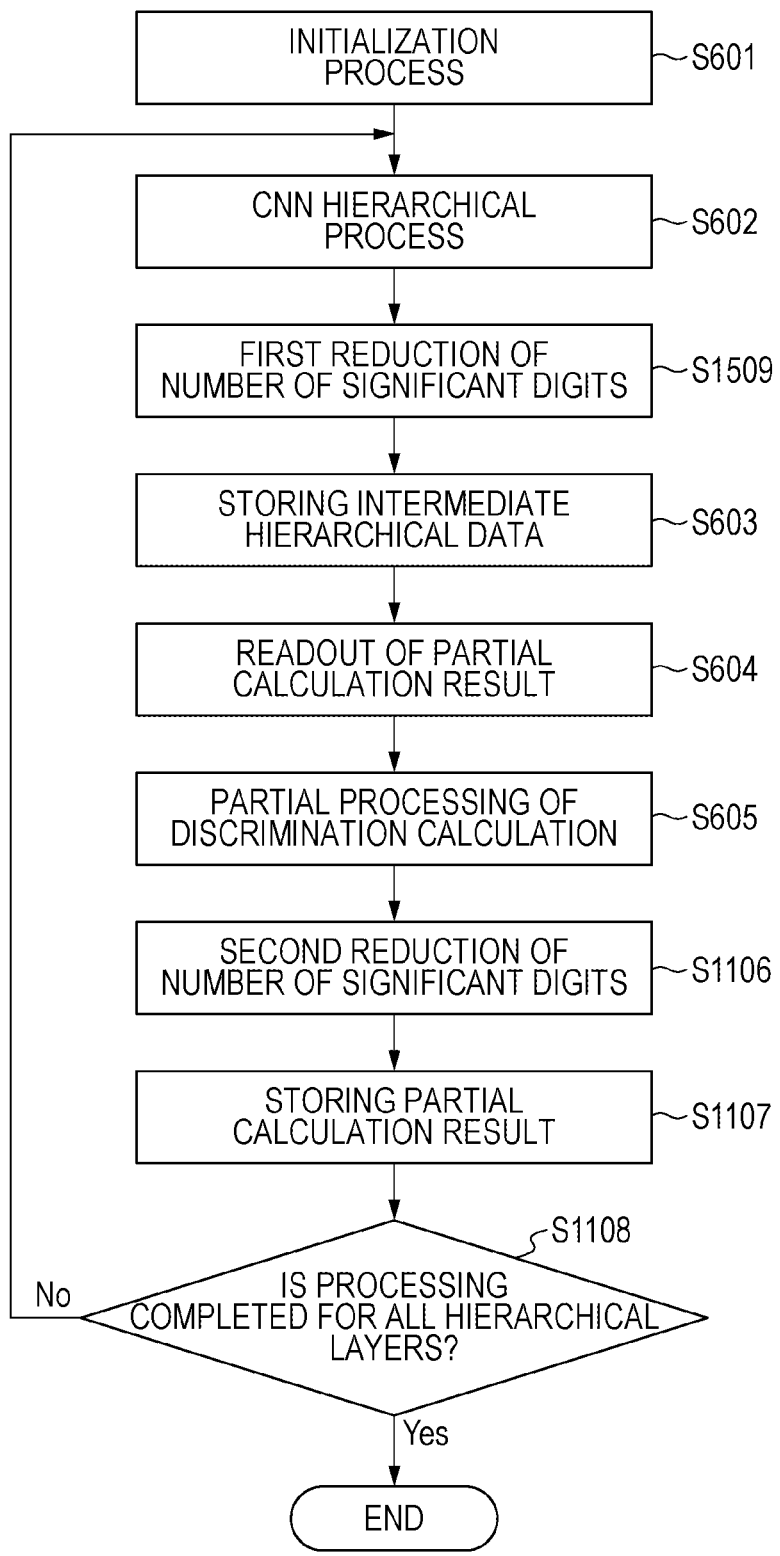
FIG. 15 is a flow chart illustrating a discrimination calculation method according to the third embodiment.

FIG. 15 is a flow chart illustrating a discrimination calculation method by the discrimination calculation apparatus 211 shown in FIG. 14. The flow chart in FIG. 15 is obtained by adding step S1509 to the flow chart in FIG. 12. Step S1509 is provided between steps S602 and S603. In step S1106, the second data reduction process unit 126 performs processing similar to that in FIG. 12.

In step S1509, the first data reduction process unit 147 reduces the number of digits of the feature plane data calculated in step S602. Next, in step S603, the CNN calculation process unit 11 stores the feature plane data with the reduced number of digits in the hierarchical data storage unit 12. In step S1106, the second data reduction process unit 126 reduces the number of digits to 10-bit data, as described in the second embodiment. On the other hand, in step S1509, the first data reduction process unit 147 reduces the number of digits to data having a data width of 8 bits. The number of digits reduced by the first data reduction process unit 147 and the number of digits reduced by the second data reduction process unit 126 are different from each other. In general, in the feature extraction processing by the CNN calculation process unit 11, the reduction in the number of digits results in a small reduction in discrimination accuracy. In contrast, in the discrimination process calculation by the partial discrimination calculation process unit 13, the reduction in the number of calculation digits often has a large influence on the discrimination accuracy.

In the present embodiment, taking into consideration the fact that the amount of data stored in the discrimination result storage unit 14 is smaller than the amount of data (feature plane data of one plane in the example shown in FIG. 4) necessary to be stored in the hierarchical data storage unit 12, the number of digits of data stored in the discrimination result storage unit 14 is set to be larger than that of other processing units. This makes it possible to realize the discrimination process using CNN intermediate hierarchical data and using the RAM 201 with a small capacity without resulting a significant reduction in discrimination accuracy.

In the first to third embodiments, an explanation has been given, as an example, for the case in which the partial calculation of the discrimination process is executed layer by layer. However, the embodiments are not limited to this example. The partial calculation may be performed in units of data determined depending on the number of pieces of feature plane data in the hierarchical network, the size of feature plane data, and the memory size of the hierarchical data storage unit 12. For example, the partial calculation of the discrimination process may be performed in units of a plurality of layers. As described in the second embodiment, when the number of digits of data stored in the discrimination result storage unit 14, if the number of times of storing the partial calculation result in the determination result holding unit 14 is reduced as much as possible, it is possible to reduce the influence of the reduction in the number of digits on the performance.

In the first to third embodiments, an explanation has been given for an example case in which the CNN calculation process is performed on two-dimensional image data. However, the CNN calculation process may also be applied to one-dimensional data such as audio data, three-dimensional data which may change with time, and/or the like.

In the first to third embodiments, an explanation has been given, as an example, for the case in which the CNN calculation process is performed as the feature extraction process. However, the embodiments are not limited to this example. Various other hierarchical processes such as Restricted Boltzmann Machines, Recursive Neural Network, or the like may be employed.

In the first to third embodiments, an explanation has been given, as an example, for the case where a CPU is used as the control unit 15. However, the entire control unit 15 may be realized using hardware for controlling sequences.

In the first to third embodiments, an explanation has been given, as an example, for the case where the convolution operation and the inner product operation are performed by hardware. However, the embodiments are not limited to this example. All processes by the pattern recognition process unit 202 may be realized by executing a program by a general-purpose CPU. Even in this case, it becomes possible to greatly reduce the amount of working memory required by the CPU. The embodiments are also effective when processing is performed by a general-purpose computer system or a cloud system.

The present invention may also be realized by providing to a system or an apparatus a storage medium including a program stored therein for implementing one or more functions disclosed in the embodiments described above and by reading and executing the program on one or more processor in a computer disposed in the system or the apparatus. The present invention may also be realized by a circuit (such as an ASIC) configured to realize one or more functions described above.

The above-described embodiments are merely examples of implementation in carrying out the present invention, and the technical scope of the present invention should not be construed in a limited manner. That is, the present invention can be implemented in various forms without departing from the technical idea or the main features thereof.

According to the present invention, it is possible to perform a discrimination calculation using a small-capacity storage unit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A discrimination apparatus comprising:
one or more processors; and
one or more memories coupled to the one or more processors, the one or more memories having stored thereon instructions which, when executed by the one or more processors, cause the apparatus to:
extract one or more features of target data in each layer of at least three processing layers of a hierarchical neural network; and
perform a discrimination of the target data by a plurality of discrimination calculations,
wherein each discrimination calculation of the plurality of discrimination calculations includes an addition of a result of a sum of products of the one or more features extracted in a corresponding one layer of the at least three processing layers and weighting factors to a result of the discrimination calculation preceding to the corresponding one layer.

2. The discrimination apparatus according to claim 1, wherein in the extraction, one or more features are extracted in a first hierarchical layer of the at least three processing layers based on the target data, the one or more features in the first hierarchical layer is stored in a feature storage area of the one or more memories, and one or more features are extracted in a second hierarchical layer of the at least three processing layers based on the one or more features in the first hierarchical layer stored in the feature storage area.

3. The discrimination apparatus according to claim 1, wherein the hierarchical neural network is a convolutional neural network and a convolution operation using the convolutional neural network is performed in the extraction of the one or more features.

4. The discrimination apparatus according to claim 1, wherein in the discrimination, a number of digits of the result of the discrimination calculation is reduced and a result of the discrimination calculation with the reduced number of digits is stored in a discrimination result storage area of the one or more memories.

5. The discrimination apparatus according to claim 1, wherein in the discrimination, a number of digits of the result of the sum of products of the one or more features extracted in the corresponding one layer and the weighting factors is reduced, a result of the sum of products with the reduced number of digits is added to the result of the discrimination calculation for the layer preceding to the corresponding one layer, and a result of the addition is stored in a discrimination result storage area of the one or more memories.

6. The discrimination apparatus according to claim 1, wherein in the discrimination, data of a particular number of digits at a particular digit position is extracted from the result of the sum of products of the one or more features extracted in the corresponding one layer and the weighing factors, the extracted data is added to the result of the discrimination calculation for the layer preceding to the corresponding one layer, and a result of the addition is stored in a discrimination result storage area of the one or more memories.

7. The discrimination apparatus according to claim 6, wherein the particular digit position varies for each layer of the at least three processing layers.

8. The discrimination apparatus according to claim 6, wherein the particular digit position varied for each category of the target data.

9. The discrimination apparatus according to claim 2, wherein in the extraction, a number of digits of the feature is reduced, and the feature with the reduced number of digits is stored in the feature storage area.

10. The discrimination apparatus according to claim 1, wherein
in the extraction of the one or more features, a number of digits of the feature is reduced, and stores the feature with the reduced number of digits is stored in a feature storage area of the one or more memories, and
in the discrimination, a number of digits of the discrimination result is reduced, and stores the discrimination result with the reduced number of digits is stored in a discrimination result storage area of the one or more memories.

11. The discrimination apparatus according to claim 10, wherein the number of digits reduced in the extraction and the number of digits reduced in the discrimination are different from each other.

12. A non-transitory computer-readable storage medium that stores a program for causing a computer to function as the discrimination apparatus according to claim 1.

13. A discrimination method, comprising:
extracting one or more features of target data in each layer of at least three processing layers of a hierarchical neural network; and
performing a discrimination of the target data by a plurality of discrimination calculations,
wherein each discrimination calculation of the plurality of discrimination calculations includes an addition of a result of a sum of products of the one or more features extracted in a corresponding one layer of the at least three processing layers and weighting factors to a result of the discrimination calculation preceding to the corresponding one layer.

* * * * *